(12) United States Patent
Wang et al.

(10) Patent No.: US 11,780,429 B2
(45) Date of Patent: Oct. 10, 2023

(54) TARGET CURVATURE ESTIMATION CONSIDERING VEHICLE DYNAMICS

(71) Applicant: Aptiv Technologies Limited, St. Michael (BB)

(72) Inventors: Xiaohui Wang, Oak Park, CA (US); Lingnan Hu, Auburn Hills, MI (US)

(73) Assignee: Aptiv Technologies Limited, St. Michael (BB)

( * ) Notice: Subject to any disclaimer, the term of this patent is extended or adjusted under 35 U.S.C. 154(b) by 285 days.

(21) Appl. No.: 17/170,819

(22) Filed: Feb. 8, 2021

(65) Prior Publication Data

US 2022/0250612 A1 Aug. 11, 2022

(51) Int. Cl.
*B60W 30/09* (2012.01)
*G06V 20/58* (2022.01)
*B60W 30/095* (2012.01)
*B60W 40/068* (2012.01)

(52) U.S. Cl.
CPC ........ *B60W 30/09* (2013.01); *B60W 30/0953* (2013.01); *B60W 30/0956* (2013.01); *B60W 40/068* (2013.01); *G06V 20/58* (2022.01); *B60W 2420/52* (2013.01); *B60W 2520/105* (2013.01); *B60W 2520/20* (2013.01); *B60W 2554/40* (2020.02)

(58) Field of Classification Search
USPC ....................................................... 701/301
See application file for complete search history.

(56) References Cited

U.S. PATENT DOCUMENTS

2019/0377354 A1* 12/2019 Shalev-Shwartz ....... G08G 1/16
2021/0064030 A1* 3/2021 Jiang ................. G08G 1/096877
2022/0379920 A1* 12/2022 Yang ..................... B60W 30/09

FOREIGN PATENT DOCUMENTS

EP 3537173 A1 9/2019

OTHER PUBLICATIONS

Tsogas et al., Unscented Kalam Filter Design for Curvilinear Motion Models suitable for Automotive safety applications, Jul. 25, 2005, 8 pages (Year: 2005).*
Liang et al., Vehicle Pure Yaw Moment Control using Differential Tire Slip, Jun. 10, 2009, pp. 3331-3336 (Year: 2009).*

(Continued)

*Primary Examiner* — Maceeh Anwari
(74) *Attorney, Agent, or Firm* — Sawtooth Patent Group PLLC

(57) ABSTRACT

This document describes target curvature estimation considering vehicle dynamics constraints. Some vehicle dynamics models use several kinematic states to predict the paths of targets identified by an object-tracking system. Rather than rely on predetermined industry measurements as the kinematic inputs to a model, an example system instead estimates some of these states using near real-time data output from a tracking filter. This can include estimating position and velocity states, as well as curvature and centripetal acceleration states. The example system is particularly suited at accurately predicting the curvature and centripetal acceleration states, which greatly improves the accuracy of the object-tracking system, and further improves safety in avoiding a target collision.

20 Claims, 11 Drawing Sheets

(56) References Cited

OTHER PUBLICATIONS

Vo-Duy et al., A Universal Dynamic and Kinematic Model of Vehicles, Oct. 19, 2015, 6 pages (Year: 2015).*
"Extended European Search Report", EP Application No. 22153191.6, dated Jul. 1, 2022, 15 pages.
Liang, et al., "Vehicle Pure Yaw Moment Control Using Differential Tire Slip", Jun. 10, 2009, pp. 3331-3336.
Polychronopoulos, et al., "Centralized Data Fusion for Obstacle and Road Borders Tracking in a Collision Warning System", Jun. 1, 2004, 8 pages.
Tsogas, et al., "Unscented Kalman Filter Design for Curvilinear Motion Models Suitable for Automotive Safety Applications", Jul. 25, 2005, 8 pages.
Vo-Duy, et al., "A Universal Dynamic and Kinematic Model of Vehicles", Oct. 19, 2015, 6 pages.
Pacejka, et al., "The Magic Formula Tyre Model", Journal of Vehicle System Dynamics, vol. 21, Dec. 1992, 19 pages.
Schofield, et al., "Vehicle Dynamics Control and Controller Allocation for Rollover Prevention", Nov. 2006, 6 pages.

* cited by examiner

| Road Surface | B | C | D | E |
|---|---|---|---|---|
| Dry Tarmac | 10.00 | 1.30 | 1.00 | 0.97 |
| Wet Tarmace | 12.00 | 1.30 | 0.82 | 1.00 |
| Snow | 5.00 | 1.30 | 0.30 | 1.00 |
| Ice | 4.00 | 1.30 | 0.10 | 1.00 |

| Road Surface/Vehicle Classification | Car* | Truck* |
|---|---|---|
| Dry Tarmac | 5.4 | 4.0 |
| Wet Tarmace | 4.9 | 3.8 |
| Snow | 0.9 | 0.6 |
| Ice | 0.3 | 0.2 |

900

TARGET CURVATURE ESTIMATION CONSIDERING VEHICLE DYNAMICS

BACKGROUND

Advanced Driver-Assistance Systems (ADAS) have been developed to assist an operator of a vehicle with various driving tasks, including tracking and predicting the paths of target vehicles. Estimating the kinematic states (e.g., position, velocity, acceleration, curvature) of the target vehicle may be necessary to accurately predict a target path and avoid a collision. Without vehicle-to-vehicle communication, these kinematic states may be perceived by an onboard sensor, such as a radar. A radar usually reports multiple detections for a single target vehicle within its field-of-view (FOV). A tracking function is used to fuse multiple detections on the target and estimate other required kinematic states based on these detections. To ensure safety and prevent collisions with the targets, accurate estimates for these states are desirable.

SUMMARY

This document describes target curvature estimation considering vehicle dynamics Many vehicle dynamics models use several kinematic states to predict the paths of targets identified by an object tracking system. Some of these states are estimated using data from a tracking filter. Many of the states are accurately estimated, including position and velocity. One such state is a curvature state, which tends to be less accurate due to its nonlinearity, but it can be improved using the methods and systems described herein.

In one example, a method includes determining, by a processor of a host vehicle, measurement states of a target, the measurement states being derived from radar detections received by an object tracking system of the host vehicle. The method further includes determining, based at least in part on the measurement states, one or more kinematic states of a motion model defined for a tracking filter employed by the object tracking system to track the target. The method further includes predicting, using the one or more kinematic states as inputs to the motion model of the tracking filter, a path of the target. The method further includes controlling, based on the predicted path of the target, the host vehicle to take evasive action and avoid a collision with the target.

In one example, a system includes a processor configured to perform this and other methods. In another example, a system is described including means for performing this and other methods. This document also describes a computer-readable storage medium comprising instructions that, when executed, configure a processor to perform the above-summarized method and other methods set forth herein, in addition to describing systems configured to perform the above-summarized method and the other methods set forth herein.

This summary introduces simplified concepts of target curvature estimation considering vehicle dynamics This summary is not intended to identify essential features of the claimed subject matter, nor is it intended for use in determining the scope of the claimed subject matter. That is, one problem solved by the described techniques is a problem of estimation errors exceeding physical limitations. Therefore, although primarily described in the context of improving radar tracking functionality of an automotive vehicle, improving target curvature estimations can be applied to other applications where accurate path prediction is desired.

BRIEF DESCRIPTION OF THE DRAWINGS

The details of one or more aspects of target curvature estimation considering vehicle dynamics are described in this document with reference to the following figures. The same numbers are often used throughout the drawings to reference like features and components.

FIGS. 11-1 to 11-3 illustrate example scenarios of target curvature estimation considering vehicle dynamics, in accordance with techniques of this disclosure.

DETAILED DESCRIPTION

Overview

Figure 1:
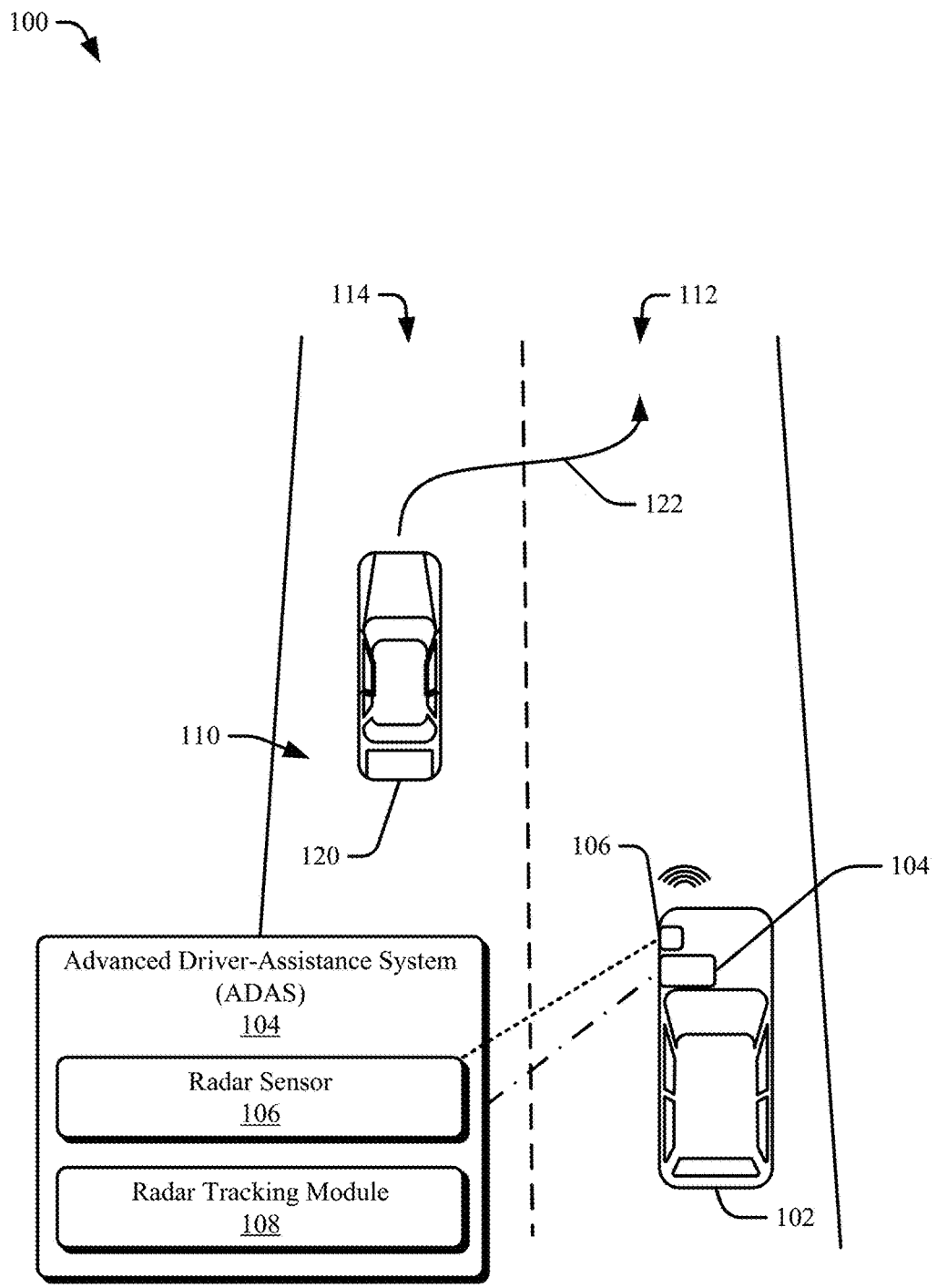
FIG. 1 illustrates an example environment in which a vehicle is configured to perform target curvature estimation considering vehicle dynamics, in accordance with techniques of this disclosure.

In some advanced driver-assistance systems (ADAS), estimating a target vehicle's kinematic states may be necessary to predict a target vehicle's path. Without vehicle-to-vehicle communication, the target's kinematic states may be perceived by an onboard sensor, a radar being one sensor capable of kinematic-state estimation. The measurement states, derived from radar detections, may include range, range rate, azimuth angle, and elevation angle. With a sufficient resolution, these radars can report multiple detections on a target vehicle inside its field-of-view (FOV). A radar tracking function can fuse multiple radar detections on a single target and report the required kinematic state.

The radar tracking function may include one or more motion models used to characterize the target, a data association between raw sensor detections and targets, and a tracking filter. This techniques, systems, and methods described in this document focus on improving the accuracy of these target kinematic-state estimations, which may be used by the motion model defined for the tracking filter. It is assumed, for simplicity of this disclosure, that the data association between raw sensor detections and targets has been achieved. In some aspects, the motion model is the Constant Turn and Constant Tangential Acceleration (CTCA) motion model and represents the dynamics of a two-axle vehicle. Due to the apparent nonlinearity between the radar measurement states and the CTCA motion state, an Extended Kalman Filter (EKF) may be selected as the tracking filter.

In general, tracking filters estimate the position and velocity states of the target relatively accurately for most driving scenarios. However, the curvature and lateral acceleration reported by the tracking filter may have larger relative errors. For example, a vehicle with a longitudinal velocity of 36.7 m/s and a curvature estimate of 0.0076 rad/m may report an implausible lateral acceleration of 10.2115 m/s$^2$. This may be explained by a higher nonlinearity between the curvature and the radar measurement states. In this example, the target vehicle-heading angle is quite small, and thus the implausible lateral acceleration estimated by the tracker primarily originated from an implausible centripetal acceleration. In the CTCA model, centripetal acceleration, $a_c$, is expressed as Eq. (1):

$$a_c = cs^2 \qquad (1)$$

where c is the curvature, and s is the velocity. By performing a simple error analysis, $\partial a_c / \partial c = s^2$, the curvature estimation is determined to be a major contributor to the centripetal-acceleration error. Since the centripetal-acceleration state is necessary for target-path prediction, a more-accurate centripetal-acceleration state estimation is desirable.

The techniques disclosed in this document improve the target curvature estimation considering vehicle dynamics. A primary and a secondary upper bound of a centripetal acceleration state are determined from two different vehicle dynamics models for complementary purposes. The primary and secondary upper bounds are compared and the lesser value of the two upper bounds is chosen as an ultimate upper bound. Choosing the ultimate upper bound in this manner ensures that more corner cases are covered. A constrained EKF based on a Constrained Constant Turn and Constant Acceleration (CCTCA) model (e.g., the model using the upper bound) runs on top of the unconstrained CTCA-EKF filter. The CCTCA-EKF checks whether a target state triggers the centripetal acceleration constraints, and if the target state violates the constraint, the CCTCA-EKF projects the unconstrained estimation to the constrained surface.

The highly nonlinear vehicle dynamics models are approximated by using a tire model developed by Pacejka in 1987, which is commonly referred to in the automotive industry as the "Pacejka Magic Formula" and using one or more tire friction force ellipse models. The extreme values of tire side-slip angles and other parameters that determine the upper bound are derived based on reasonable assumptions and publications related to tire and vehicle dynamics. In this way, an example system, through applying these extreme values and approximated vehicle dynamics models, simplifies implementation and reduces computation time.

Example Environment

FIG. 1 illustrates an example environment 100 in which a vehicle 102 is configured for target curvature estimation considering vehicle dynamics, in accordance with techniques of this disclosure. In the depicted environment 100, the vehicle 102 is equipped with an ADAS 104. The ADAS 104 can include sensors (e.g., radar sensor 106) and a radar tracking module 108. Although depicted as a car, the vehicle 102 can represent other types of vehicles and machinery (e.g., a motorcycle, a bus, a tractor, a semi-trailer truck, watercraft, aircraft, or other heavy equipment), including manned and unmanned systems that may be used for a variety of purposes. The vehicle 102 can travel on a road 110. In this example environment, the road 110 is a one-way road with two lanes, a lane 112 and a lane 114. Moving objects may also be in or near the road 110, for example, a moving vehicle 120. Based on radar detections gathered by the radar sensor 106, the radar tracking module may determine a predicted path 122 of the vehicle 120.

The ADAS 104 can track objects in the field-of-view (FOV) based on sensor data obtained from one or more sensors of the vehicle 102. In this example, vehicle 102 is equipped with the radar sensor 106, but the vehicle 102 can be equipped with any number of sensors. The ADAS 104 tracks targets in the FOV based on sensor data received from sensors of the vehicle 102. Predicting the paths (i.e., the predicted path 122) of any targets in the FOV enables the ADAS 104 to reliably track the targets and avoid them while the vehicle 102 navigates the road 110.

In general, manufacturers can mount the ADAS 104 to any moving platform that can travel on the road 110. The ADAS 104 can project its FOV from any exterior surface of the vehicle 102. For example, vehicle manufactures can integrate at least a part of the ADAS 104 into a side mirror, roof, bumper, or any other interior or exterior location where the FOV includes the road 110 and any targets, moving or stationary, that are near the road 110. In the example, a portion of the ADAS 104 is mounted near the front bumper of the vehicle 102.

The ADAS 104 is equipped with the radar tracking module 108 that tracks targets within the FOV through a tracking function. The radar tracking module 108 comprises machine-readable instructions that when executed by a processor or other logic of the ADAS 104, causes the processor or other logic to accept detections from the radar sensor 106 and predict the path of the target. The radar tracking module 108 may include a combination of hardware, software, and/or firmware, for enabling target path predictions.

Figure 2:
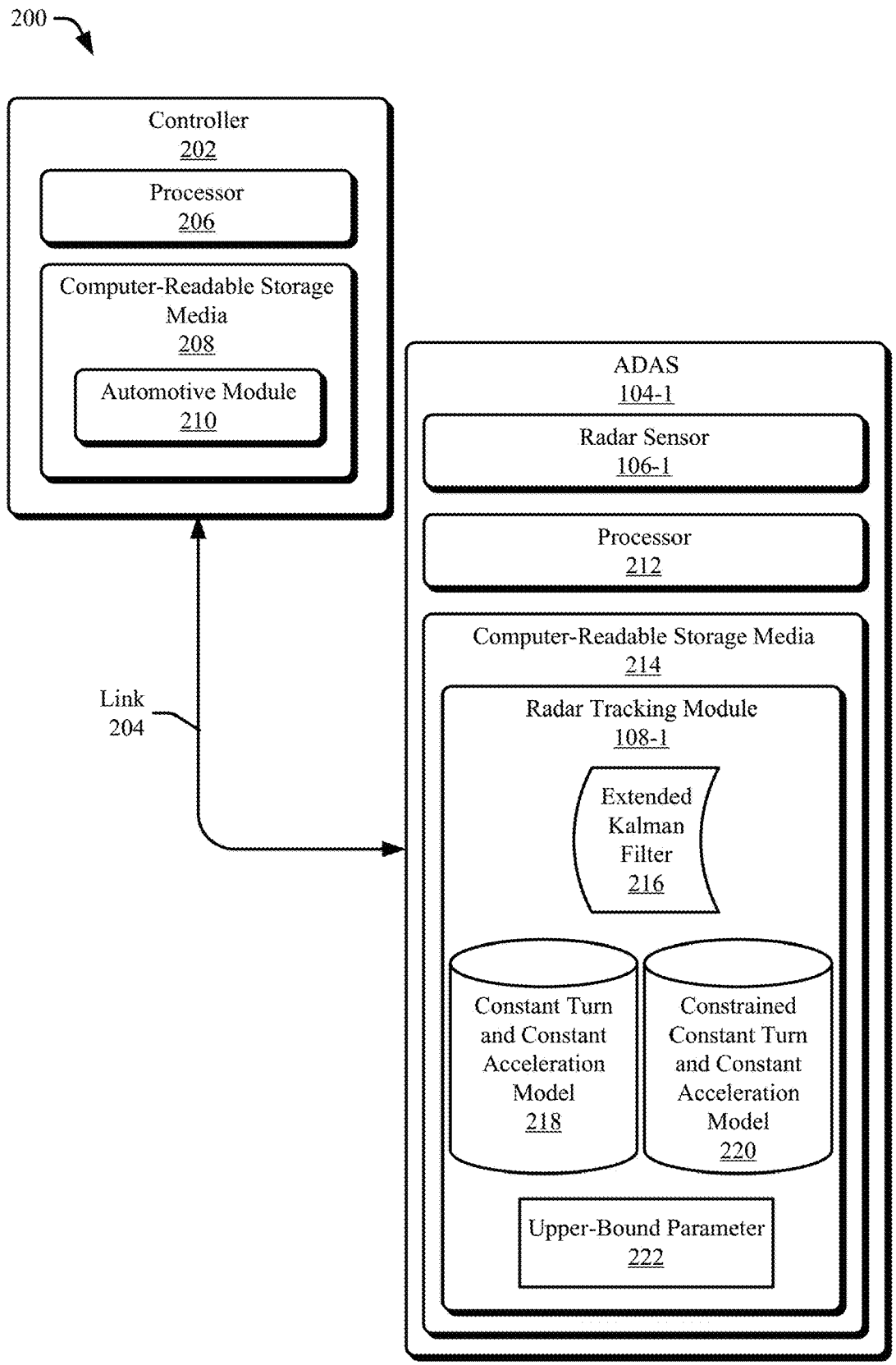
FIG. 2 illustrates an example of an automotive system configured to perform target curvature estimation considering vehicle dynamics, in accordance with techniques of this disclosure.

FIG. 2 illustrates an example of an automotive system 200 configured to perform target curvature estimation considering vehicle dynamics, in accordance with techniques of this disclosure. The automotive system 200 can be integrated within the vehicle 102.

The automotive system 200 includes a controller 202 and an ADAS 104-1. The ADAS 104-1 is an example of the ADAS 104 and can be integrated into an automotive or other vehicular environment. The ADAS 104-1 and the controller 202 communicate over a link 204. The link 204 may be a wired or wireless link and, in some cases, includes a communication bus. The controller 202 performs operations based on information received over the link 204, such as data output from the ADAS 104 as objects in the FOV are identified and tracked.

The controller 202 includes a processor 206 and a computer-readable storage medium (CRM) 208 (e.g., a memory, long-term storage, short-term storage), which stores instructions for an automotive module 210. The ADAS 104-1 includes a radar sensor 106-1. Any number of other sensors, including the radar sensor 106-1, may likewise be used. The ADAS 104-1 may include processing hardware that includes a processor 212 and a computer-readable storage medium (CRM) 214, which stores instructions associated with a radar tracking module 108-1. The radar tracking module 108-1, which is an example of the radar tracking module 108, may include a tracking filter 216 (e.g., EKF) defined by one or more motion models. In this example, the tracking filter 216 is defined by a CTCA model 218 and a CCTCA model 220. The CCTCA model 220 is constrained by an upper-bound parameter 222 of dynamic vehicle states that is determined by techniques disclosed herein.

The processors 206 and 212 can be two separate or a single microprocessor, or a pair of or a single system-on-chip of a computing device, a controller, or a control unit. The processors 206 and 212 execute computer-executable instructions stored within the CRMs 208 and 214. As an example, the processor 206 can execute the automotive module 210 to perform a driving function or other operation of the automotive system 200. Similarly, the processor 212 can execute the radar tracking module 108-1 to infer objects in the FOV based on sensor data obtained from multiple different sensors 106 of the vehicle 102. The automotive module 210, when executing at the processor 206, can receive an indication of one or more objects detected by the radar tracking module 108-1 in response to the radar tracking module 108-1 combining and analyzing sensor data generated at each of the sensors 106 (e.g., the radar sensor 106-1).

The radar tracking module 108-1 can receive target data from the radar sensor 106-1, and in response to receiving the target data, input the target data into the CTCA model 218. The CTCA model 218 can estimate vehicle dynamic states from the target data. For instance, if the CTCA model 218 estimates a vehicle state that exceeds a threshold set by an upper-bound parameter 222, the unconstrained estimation can be projected to a constrained surface that is constrained due to the estimation being replaced by the upper-bound parameter 222, as determined by a CCTCA model 220. By constraining the dynamic vehicle state estimation with a maximum realistic bound (e.g., the upper-bound parameter 222), the dynamic vehicle state estimate may reflect a realistic value. The estimated dynamic vehicle states, determined by either the CTCA model 218 or the CCTCA model 220 (if the one or more states were constrained), can be input to a tracking filter 216. The tracking filter 216 can use the state estimations to predict a path of the target. As the radar tracking module 108-1 tracks the target path, based on the path prediction by the tracking filter 216, the ADAS 104-1 can report instructions for avoiding the target to the automotive module 210.

Example Architecture

The following example architecture includes examples of determining the primary, secondary, and ultimate upper bounds. Once an ultimate upper bound is determined, it may be used by the radar tracking module to constrain the vehicle (e.g., centripetal) acceleration state for path prediction purposes.

Figure 3:
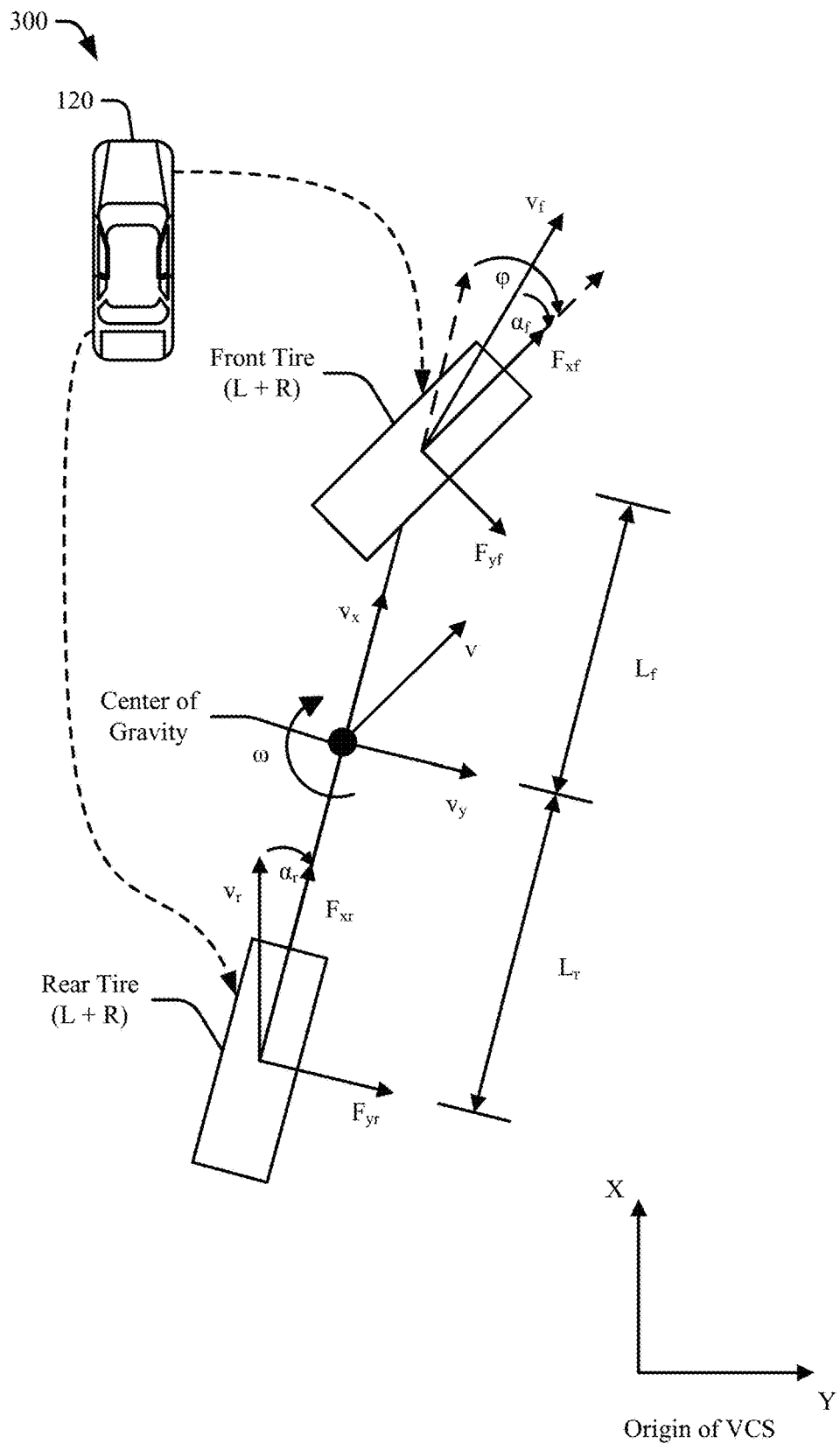
FIG. 3 illustrates an example of a vehicle dynamics model that is employed to determine target curvature estimation considering vehicle dynamics, in accordance with techniques of this disclosure.

FIG. 3 illustrates an example of a vehicle dynamics model (e.g., a bicycle model) that is employed to determine target curvature estimation considering vehicle dynamics constraints, in accordance with techniques of this disclosure. Physical limitations of vehicle dynamics may restrict the achievable centripetal acceleration of a vehicle. The bicycle model and the Pacejka Magic Formula are employed to perform vehicle dynamics analysis and derive a primary upper bound of the achievable centripetal acceleration. The bicycle model combines, for analytical purposes, both front tires into a single front tire and both rear tires into a single rear tire.

The bicycle model in FIG. 3 uses the following variables:
F: tire force;
L: distance from Center of Gravity (COG) to front or rear axle;
v: velocity (note that v without subscripts f or r represents the velocity of vehicle COG);
ω: yaw rate (heading rate);
α: tire side-slip angle (steering angle not included);
φ: steering angle of a front tire;
subscripts:
 x: longitudinal;
 y: lateral;
 f: front tire;
 r: rear tire.

In one example of bicycle model analysis, the target vehicle drives on a flat road with no lateral slope, and the target vehicle has four wheels (two axles) and steers with the front wheels. The vehicle dynamics in the bicycle model can be represented by the Eq. Set (2):

$$\begin{cases} v_x = v_f \cdot \cos(\varphi - \alpha_f) \\ v_x = v_r \cdot \cos(\alpha_r) \\ v_y + \omega \cdot L_f = v_f \cdot \sin(\varphi - \alpha_f) \\ v_y - \omega * L_r = -v_r \cdot \sin(\alpha_r) \end{cases} \quad (2)$$

The tire side-slip angles, $\alpha_f$ and $\alpha_r$, can be derived from Eq. Set (2) and represented as Eq. Set (3):

$$\begin{cases} \alpha_f = \varphi - \tan^{-1}\left(\frac{v_y + \omega \cdot L_f}{v_x}\right) \\ \alpha_r = -\tan^{-1}\left(\frac{v_y + \omega \cdot L_r}{v_x}\right) \end{cases} \quad (3)$$

The equations in Eq. Set (3) are nonlinear, and not all the parameters are perceivable from a host sensor. However, general values for most vehicles can be found in industry publications related to tire and vehicle dynamics. Eq. (4) is an example of general values from industry publications used in the techniques described herein:

$$\alpha_{max} = \begin{cases} 3 \text{ degrees } - \text{cars including } SUVs \\ 2 \text{ degrees } - \text{trucks and buses} \end{cases} \quad (4)$$

where $\alpha_{max}$ is the maximum tire side-slip angle for most vehicles.

The Pacejka Magic Formula, Eq. (5), is employed to derive the lateral force that each tire can provide, $F_{y\ primary}$.

$$F_{y\ primary} = m \cdot g \cdot D \cdot \sin(C \cdot \tan^{-1}(B \cdot \alpha - E \cdot (B \cdot \alpha - \tan^{-1}(B \cdot \alpha)))) \quad (5)$$

where α is the tire side-slip angle, and the coefficient B represents stiffness factor, coefficient C represents shape factor, m represents vehicle mass loaded on the tire, and g represents gravity. Coefficient D represents peak factor, and coefficient E curvature factor. The subscript y indicates "in the lateral direction," and primary indicates "for primary bound."

Figures 4, 5:
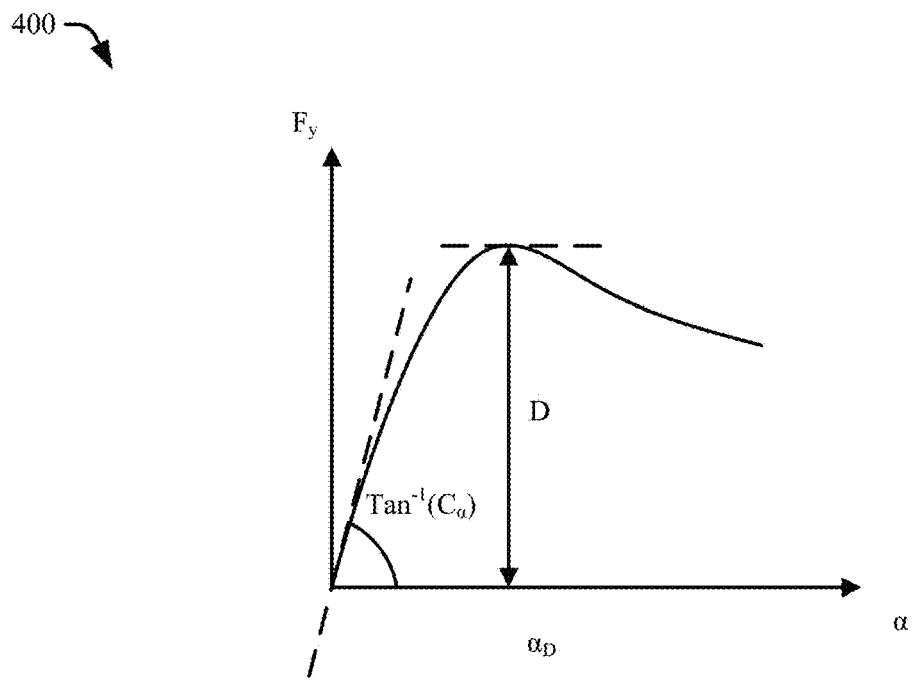
FIG. 4 illustrates a graph representing the relationship, using the Pacejka Magic Formula, between lateral tire force and tire side-slip angle, in accordance with techniques of this disclosure.
FIG. 5 illustrates the coefficients of lateral tire force versus tire side-slip angle used in the Pacejka Magic Formula, in accordance with techniques of this disclosure.

FIG. 4 illustrates a graph representing the relationship, using the Pacejka Magic Formula, between a lateral tire force and a tire side-slip angle, in accordance with techniques of this disclosure. $F_y$ is the tire lateral force, $\alpha_D$ is the tire side-slip angle corresponding to the maximum tire lateral force, and $\tan^{-1}(C_\alpha)$ is the slope of the curve at the origin point.

Shown in Eq. (4) is $\alpha_{max}$, which is smaller than $\alpha_D$ for most vehicles. As a result, Eq. (5) is used to derive the tire lateral force $F_y$ corresponding to $\alpha_{max}$. FIG. 5 illustrates the coefficients of lateral tire force versus tire side-slip angle used in the Pacejka Magic Formula, in accordance with techniques of this disclosure. The general coefficient values can be derived from industry publications related to tire and vehicle dynamics The maximum centripetal acceleration, $\alpha_{primary}$, can be derived from $F_y$ by:

$$\alpha_{primary} = \frac{F_{y\,primary}}{m} \qquad (6)$$

The applied Pacejka Magic Formula only considers tire lateral forces (which are of the same value but counteracted by tire friction forces from the ground). However, the total tire forces include both lateral and longitudinal force components. Thus, the friction force ellipse model [4] is employed to compute the maximum lateral forces that a tire can provide by considering the contribution of tire longitudinal forces. These forces are used to derive the secondary upper bound.

Figure 6:
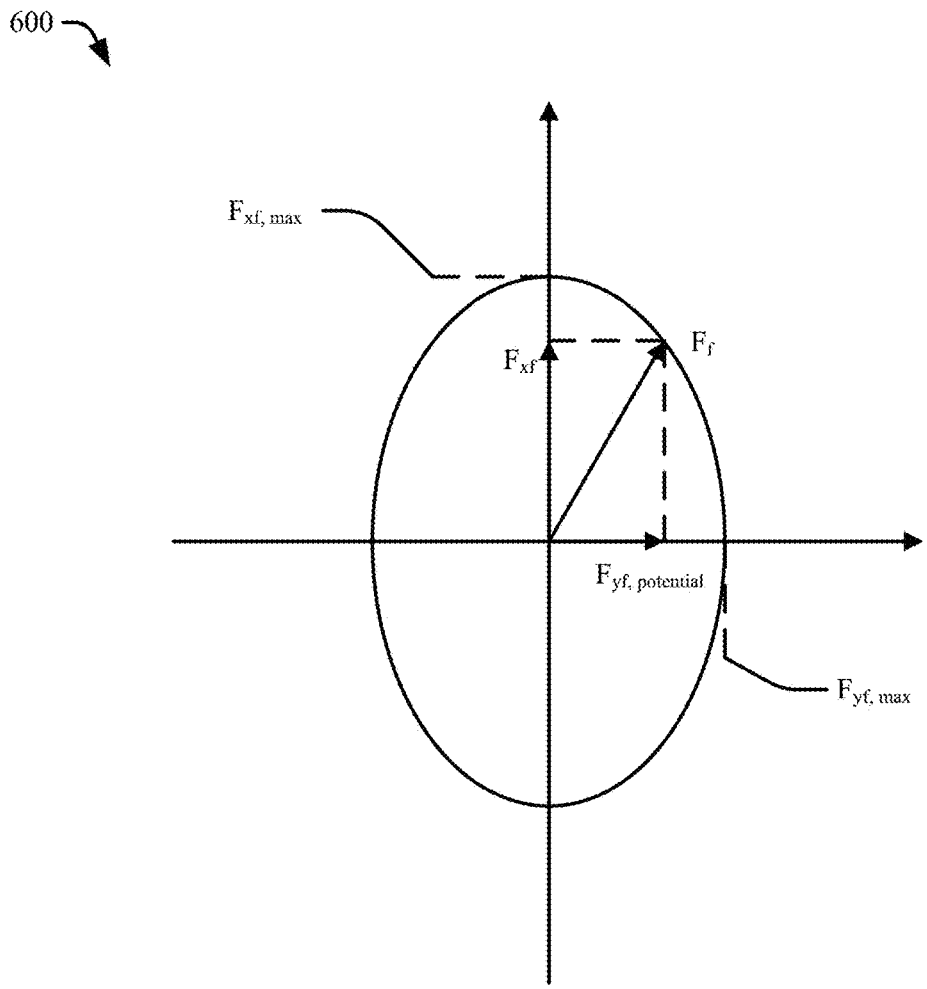
FIG. 6 illustrates a graph representing a tire friction forces ellipse vehicle dynamics model, in accordance with techniques of this disclosure.

FIG. 6 illustrates a graph representing a tire friction forces ellipse vehicle dynamics model, in accordance with techniques of this disclosure. In the illustration, the variables have the following meaning:

$F_{xf,\,max}$: maximum tire longitudinal force;
$F_{yf,\,max}$: maximum tire lateral force;
$F_{xf}$: longitudinal tire force;
$F_{yf,\,potential}$: maximum achievable tire lateral force;
$F_f$: resultant tire force (combined longitudinal and lateral forces).

The maximum friction forces that a tire can achieve are represented by the blue ellipse and is given by Eq. Set (7), $$\begin{cases} F_{xf,max} = \mu_x \cdot F_{zf} \\ F_{yf,max} = \mu_y \cdot F_{zf} \end{cases} \qquad (7)$$

where
$\mu$: the friction coefficient between the tire and the road;
$F_{zf}$: the vertical force (gravity of Earth) on the tire;
subscripts
x: longitudinal direction;
y: lateral direction.

When the longitudinal friction forces increase, the maximum achievable lateral friction forces decrease. In other words, the resultant force value of the maximum tire lateral friction forces derived for the primary bound and the tire longitudinal forces never goes beyond the circle. When there are longitudinal tire friction forces, which is true during most of the driving time, the maximum achievable tire lateral friction forces will decrease from $F_{yf,max}$ to $F_{yf,potential}$. Therefore, it may not be necessary to compare the lateral forces derived for the primary bound with the maximum achievable lateral forces and make sure that they do not go beyond the friction force ellipse. The ellipse may be formulated by Eq. (8), $$\left(\frac{F_{xf}}{F_{xf,max}}\right)^2 + \left(\frac{F_{yf,potential}}{F_{yf,max}}\right)^2 = 1 \qquad (8)$$

By accounting for tire longitudinal forces, the maximum achievable tire lateral forces may be given by Eqs. (9) and (10), $$F_{y,secondary} = \sqrt{(\mu mg)^2 - F_{xf}^2} \qquad (9)$$

where $$F_{xf} \approx 0.125 \cdot \rho \cdot C_d A \cdot v^2 + \mu_{roll} \cdot m \cdot g \qquad (10)$$

P: air density,
$C_d A$: drag coefficient multiplied by drag area,
$\mu$: friction coefficient between the tire and road,
$\mu_{roll}$: rolling friction coefficient between the tire and road,
v: vehicle velocity,
m: lower bound of mass of each certain type of vehicle loaded on the tire,
g: gravity of Earth, The secondary bound of the centripetal acceleration is derived in Eq (11), $$\alpha_{secondary} = \frac{F_{y\,secondary}}{m} \qquad (11)$$

Note that the longitudinal tire forces $F_{xf}$ given in Eq. (10) is a conservative estimate as the parameters in Eqs. (9)-(11) are set to the value of a lower bound for certain types of vehicles to cover extreme cases. $F_{xf}$ may be smaller than real values for most vehicles. As a result, $F_{y,secondary}$ may be greater than real values. Therefore, when comparing the secondary bound with the primary one, the smaller value is chosen as the value of the ultimate upper bound.

Figure 7:
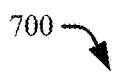
FIG. 7 illustrates ultimate upper-bound values determined from the vehicle dynamics models employed, in accordance with techniques of this disclosure.

FIG. 7 illustrates ultimate upper-bound values of centripetal acceleration determined from the vehicle dynamics models employed, in accordance with techniques of this disclosure. These ultimate upper-bound values will be applied in a CCTCA-EKF tracking filter, as presented herein.

Figure 8:
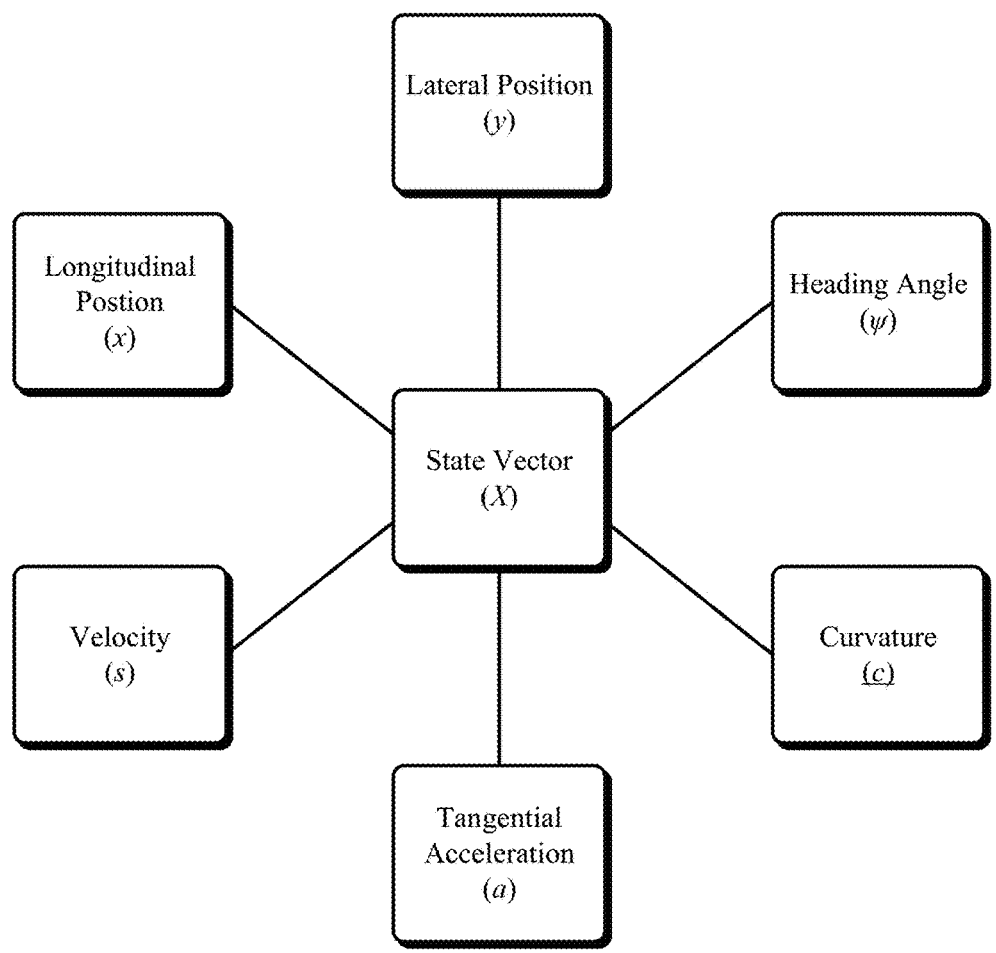
FIG. 8 illustrates some kinematic states that may be included in a state vector of a motion model.

The vehicle dynamic constraints derived in FIG. 7 may be added to the CTCA tracker filter to provide better curvature estimation. FIG. 8 illustrates some kinematic states that may be included in a state vector of a motion model such as the CTCA model. The CTCA state vector is denoted as $X=[x, y, \psi, s, c, a]^T$, where
x: longitudinal position,
y: lateral position,
$\psi$: heading angle,
s: velocity,
c: curvature,
a: tangential acceleration.

Taking the centripetal acceleration upper bound into account, the target vehicle follows the CCTCA motion model, Eq. (12):

$$\begin{bmatrix} \dot{x} \\ \dot{y} \\ \dot{\psi} \\ \dot{s} \\ \dot{c} \\ \dot{a} \end{bmatrix} = \begin{bmatrix} s*\cos(\psi) \\ s*\sin(\psi) \\ cs \\ a \\ 0 \\ 0 \end{bmatrix} + \begin{bmatrix} 0 \\ 0 \\ 0 \\ 0 \\ n_1 \\ n_2 \end{bmatrix}, n_1 \sim N(0, q_1), n_2 \sim N(0, q_2) \qquad (12)$$

subject to the centripetal acceleration constraint, Eq. (13):

$$|a_c|=|c*s^2|<d \tag{13}$$

where the upper bound of the centripetal acceleration is known from FIG. 7. For different types of vehicles at different road conditions, d can take different values. Given the CTCA state vector, both the state transition model and constrain are nonlinear. A constrained EKF is implemented to resolve the problem.

Figure 9:
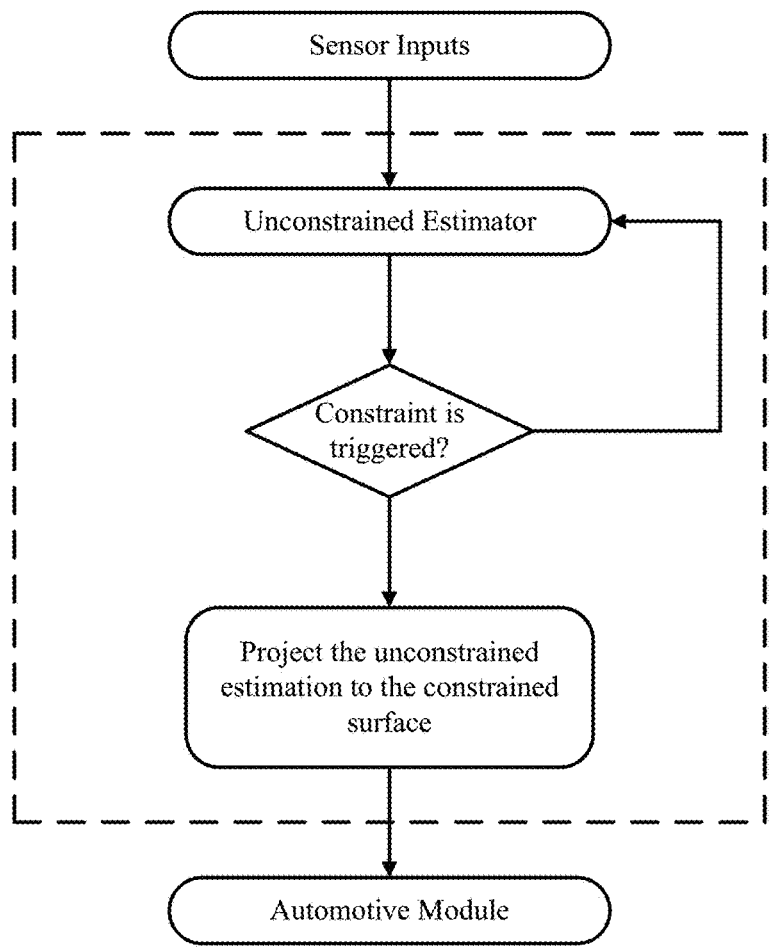
FIG. 9 illustrates a flow chart of the Constrained Constant Turn and Constant Acceleration (CCTCA) tracking filter used to determine target curvature estimation considering vehicle dynamics, in accordance with techniques of this disclosure.

FIG. 9 illustrates a flow chart of the CCTCA tracking filter used to determine target vehicle centripetal acceleration estimation considering vehicle dynamics constraints, in accordance with techniques of this disclosure. It is generally executed on top of the unconstrained CTCA-EKF filter but with two additional steps: 1) it checks whether a target in the application scope triggers the centripetal acceleration constraints, and 2) for any track violating the constraint, it projects the unconstrained estimation to the constrained surface.

Given the CTCA state vector and its state transition function mentioned above, we can use the following EKF filter to estimate its state.

$$\begin{cases} \hat{x}_{\overline{k}+1} = F_k \hat{x}_k \\ P_{\overline{k}+1} = F_k P_k F_k^T + Q \end{cases} \tag{14}$$

$$\begin{cases} K_{k+1} = P_{\overline{k}+1} H^T (H P_{\overline{k}+1} H^T + R)^{-1} \\ \hat{x}_{k+1} = \hat{x}_{\overline{k}+1} + K_{k+1}(z_{k+1} - H\hat{x}_{\overline{k}+1}) \\ P_{k+1} = (I - k + 1H) P_{\overline{k}+1} \end{cases} \tag{15}$$

where Eq. (14) is used to predict the state and Eq. (15) is used to update the state, and $x_k$: state vector at scan index k,
$P_k$: error covariance at scan index k,
$P_{k+1}$: error covariance at scan index k,
Q: covariance of process noise,
R: covariance of measurement noise,
z: measurement vector,
H: observation matrix, will be Jacobian matrix in the case of nonlinear measurement,
$F_k$: state transition matrix (Jacobian matrix).

By solving the Eq. (12) of the CTCA state transition function, the state transition matrix $F_k$ can be expressed as:

$$F_k = \begin{bmatrix} 1 & 0 & F_{13} & F_{14} & F_{15} & F_{16} \\ 0 & 1 & F_{23} & F_{24} & F_{25} & F_{26} \\ 0 & 0 & 1 & F_{34} & F_{35} & F_{36} \\ 0 & 0 & 0 & 1 & 0 & T \\ 0 & 0 & 0 & 0 & 1 & 0 \\ 0 & 0 & 0 & 0 & 0 & 1 \end{bmatrix} \tag{16}$$

Where $$\begin{cases} F_{13} = -\sin(\psi_k)\left(s_k T + a_k \frac{T^2}{2}\right) - \cos(\psi_k)\left(c_k s_k^2 \frac{T^2}{2} + c_k a_k s_k \frac{T^3}{2} + c_k a_k^2 \frac{T^4}{8}\right) \\ F_{14} = \cos(\psi_k) T - \sin(\psi_k)\left(c_k s_k T^2 + c_k a_k \frac{T^3}{2}\right) \\ F_{15} = -\sin(\psi_k)\left(s_k^2 \frac{T^2}{2} + a_k s_k \frac{T^3}{2} + a_k^2 \frac{T^4}{8}\right) \\ F_{16} = \cos(\psi_k)\frac{T^2}{2} - \sin(\psi_k)\left(c_k s_k \frac{T^3}{2} + c_k a_k \frac{T^4}{4}\right) \\ F_{23} = \cos(\psi_k)\left(s_k T + a_k \frac{T^2}{2}\right) - \sin(\psi_k)\left(c_k s_k^2 \frac{T^2}{2} + c_k a_k s_k \frac{T^3}{2} + c_k a_k^2 \frac{T^4}{8}\right) \\ F_{24} = \sin(\psi_k) T - \cos(\psi_k)\left(c_k s_k T^2 + c_k a_k \frac{T^3}{2}\right) \\ F_{25} = \cos(\psi_k)\left(s_k^2 \frac{T^2}{2} + a_k s_k \frac{T^3}{2} + a_k^2 \frac{T^4}{8}\right) \\ F_{26} = \sin(\psi_k)\frac{T^2}{2} + \cos(\psi_k)\left(c_k s_k \frac{T^3}{2} + c_k a_k \frac{T^4}{4}\right) \\ F_{34} = c_k T \\ F_{35} = s_k T + a_k \frac{T^2}{2} \\ F_{36} = c_k \frac{T^2}{2} \end{cases} \tag{17}$$

Assuming the tracker filter is properly initialized, the process noise Q can be derived by a reasonable noise model, and the measurement vector z and its error covariance R are known from the sensor model, the EKF above may be rolled over to estimate the state at each cycle.

At the end of each tracking cycle, a check can be made as to whether the centripetal acceleration constraint is triggered for each vehicle track in the constraint scope. For the sake of simplicity, in the following analysis it is assumed the curvature is positive, and therefore the sign of centripetal acceleration is also positive. At track index k, for any track that violated the inequality constraint defined in Eq. (13), the track state is projected to the closest surface defined by $$f(x_k) = c_k * s_k^2 = d \tag{18}$$

To further simplify the analysis, first linearize the constraint surface defined in the above equation at the estimated state $\hat{x}_k$ is linearized. Ignoring the higher-order terms results in $$\hat{c}_k * \hat{s}_k + D_k(x_k - \hat{x}_k) = d \xrightarrow{yields} D_k x_k = d_l \tag{19}$$

Where $D = [0, 0, 0, 2\hat{s}_k \hat{c}_k, s_k^2, 0]$ and $d_l = d - \hat{c}_k * \hat{s}_k + D_k \hat{x}_k$.

To project the states to the constrained surface, it is preferable the constrained state to have the maximum probability. In the EKF filter, the unconstrained estimation $\hat{x}_k$ follows the normal distribution: $N(\hat{x}_k, P_{k+1})$. To maximize the probability of the constrained estimation $\tilde{x}_k$, the problem turns out to be $\min[(\tilde{x}_k - \hat{x}_k)^T P_k^{-1} (\tilde{x}_k - \hat{x}_k)]$, subject to $D_k \tilde{x}_k = d_l$.

The Lagrangian function $L = (\tilde{x}_k - \hat{x}_k)^T P_k^{-1} (\tilde{x}_k - \hat{x}_k) + 2\lambda (D_k \tilde{x}_k - d_l)$ $$\begin{cases} \frac{\delta L}{\delta \tilde{x}_k} = 0 \xrightarrow{yields} P_k^{-1}(\tilde{x}_k - \hat{x}_k) + D_k^T \lambda = 0 \\ \frac{\delta L}{\delta \lambda} = 0 \xrightarrow{yields} D_k \tilde{x}_k - d_l = 0 \end{cases} \tag{20}$$

solves the optimization problem.

Solving the above joint equation gives the constrained estimation:

$$\tilde{x}_k = \hat{x}_k + P_k D_k^T (D_k P_k D_k^T)^{-1} (d_l - D_k \hat{x}_k) \tag{21}$$

Example Methods

Figure 10:
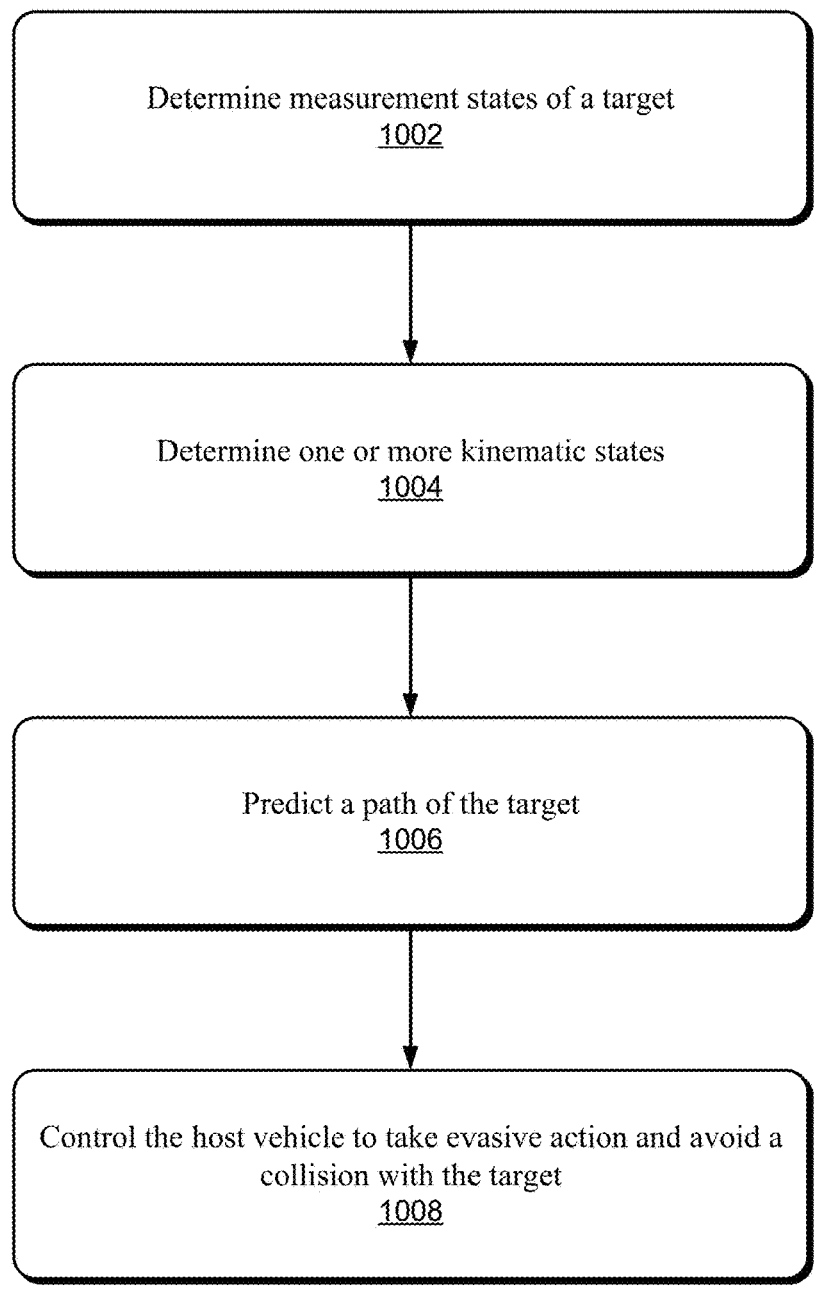
FIG. 10 illustrates an example method for target curvature estimation considering vehicle dynamics, in accordance with techniques of this disclosure.

FIG. 10 illustrates an example method for target curvature estimation considering vehicle dynamics constraints, in accordance with techniques of this disclosure. The method 1000 is shown as a set of operations (or acts) performed in, but not limited to, the order or combinations in which the operations are shown or described. Further, any of the operations may be repeated, combined, or reorganized to provide other methods. In portions of the following discussion, reference may be made to the previously introduced figures in describing some non-limiting examples of method 1000.

At 1002, measurement states of a target are determined by a processor of a host vehicle. The measurement states may be derived from radar detections received by an object tracking system of the host vehicle. The measurement states may include range, range rate, azimuth angle, and elevation angle. At 1004, based at least in part on the measurement states, one or more kinematic states of a motion model are determined. The kinematic states may include longitudinal position, lateral position, heading angle, velocity, curvature and tangential acceleration. The motion model may be defined for a tracking filter employed by the object tracking system to track the target.

At 1006, a path of the target is predicted using the one or more kinematic states as inputs to the motion model of the tracking filter. At 1008, the host vehicle is controlled, based on the predicted path of the target, to take evasive action and avoid a collision with the target.

Figures 1, 11:
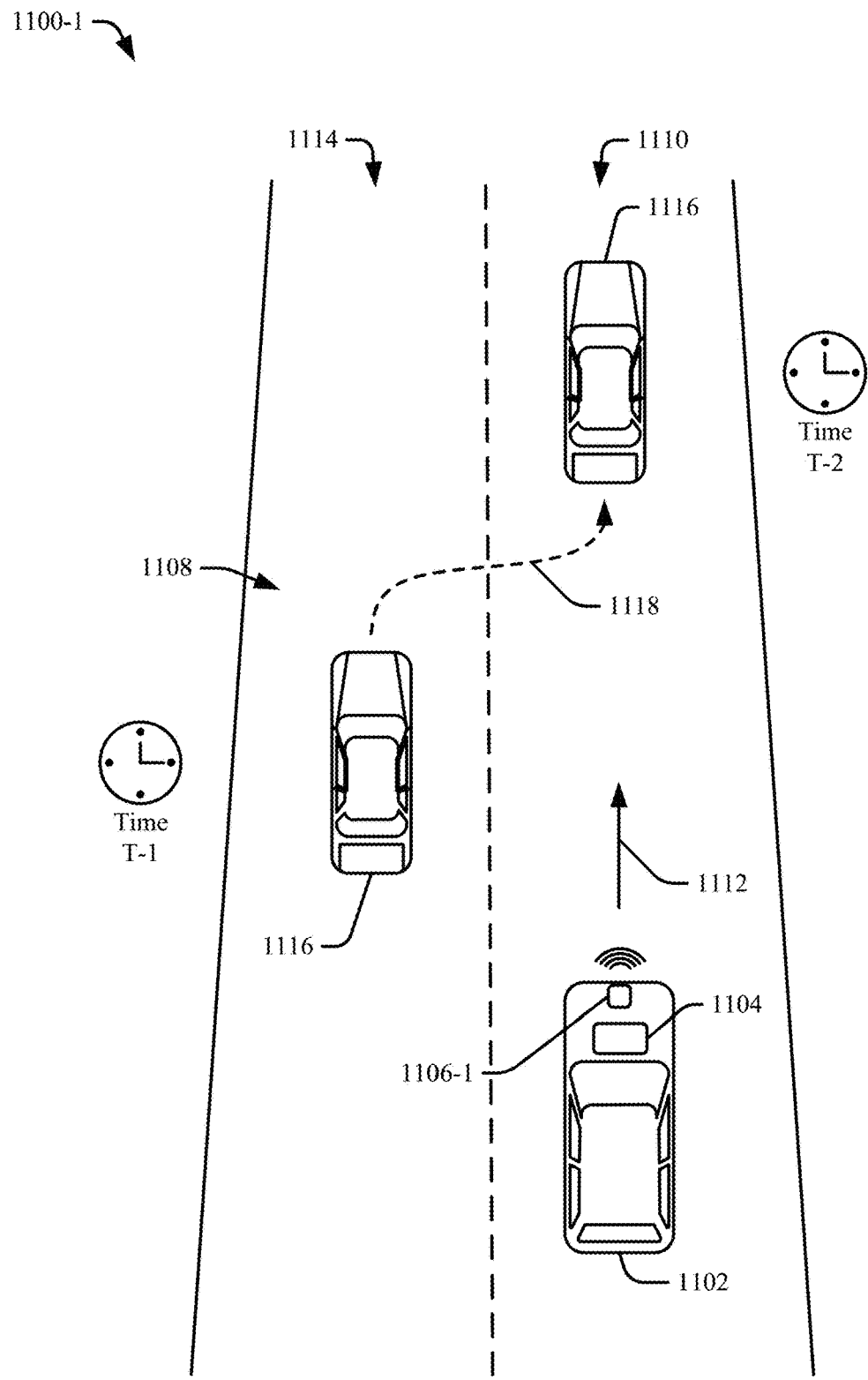
Figures 2, 11:
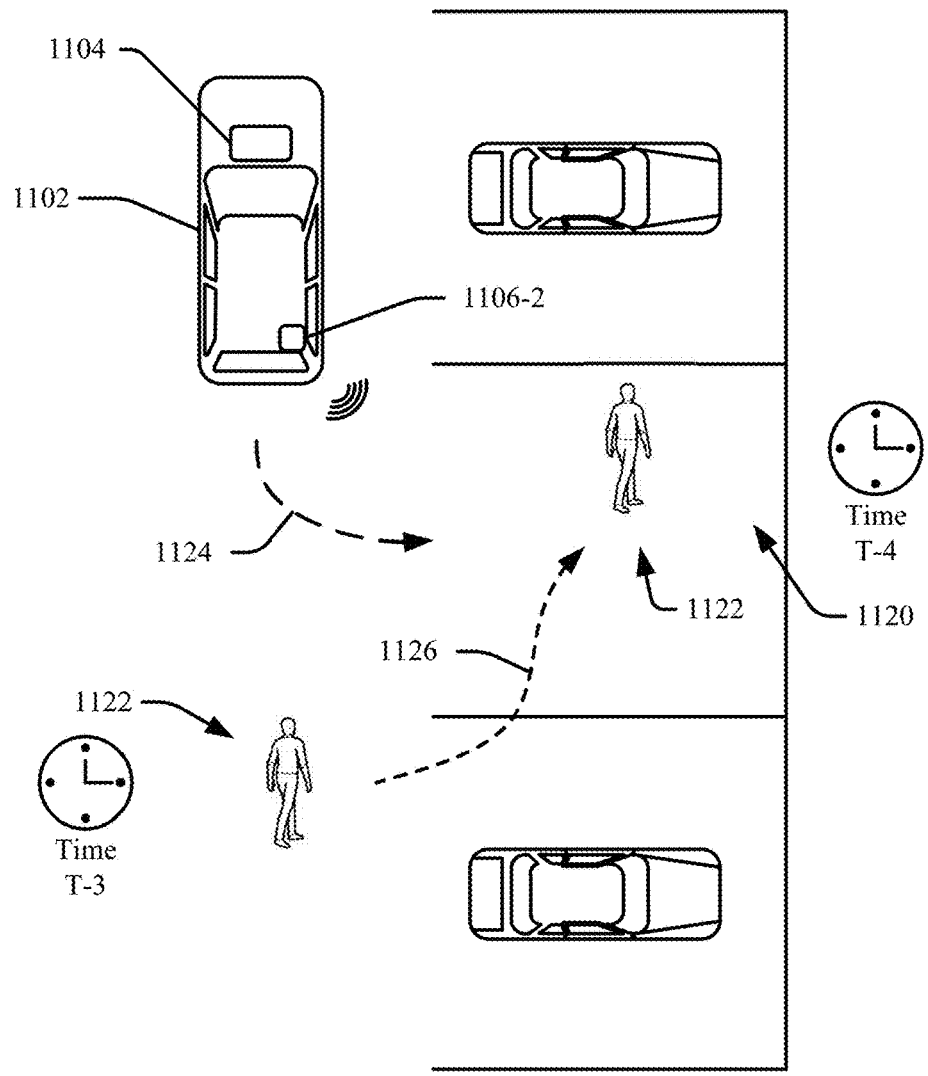
Figures 3, 11:
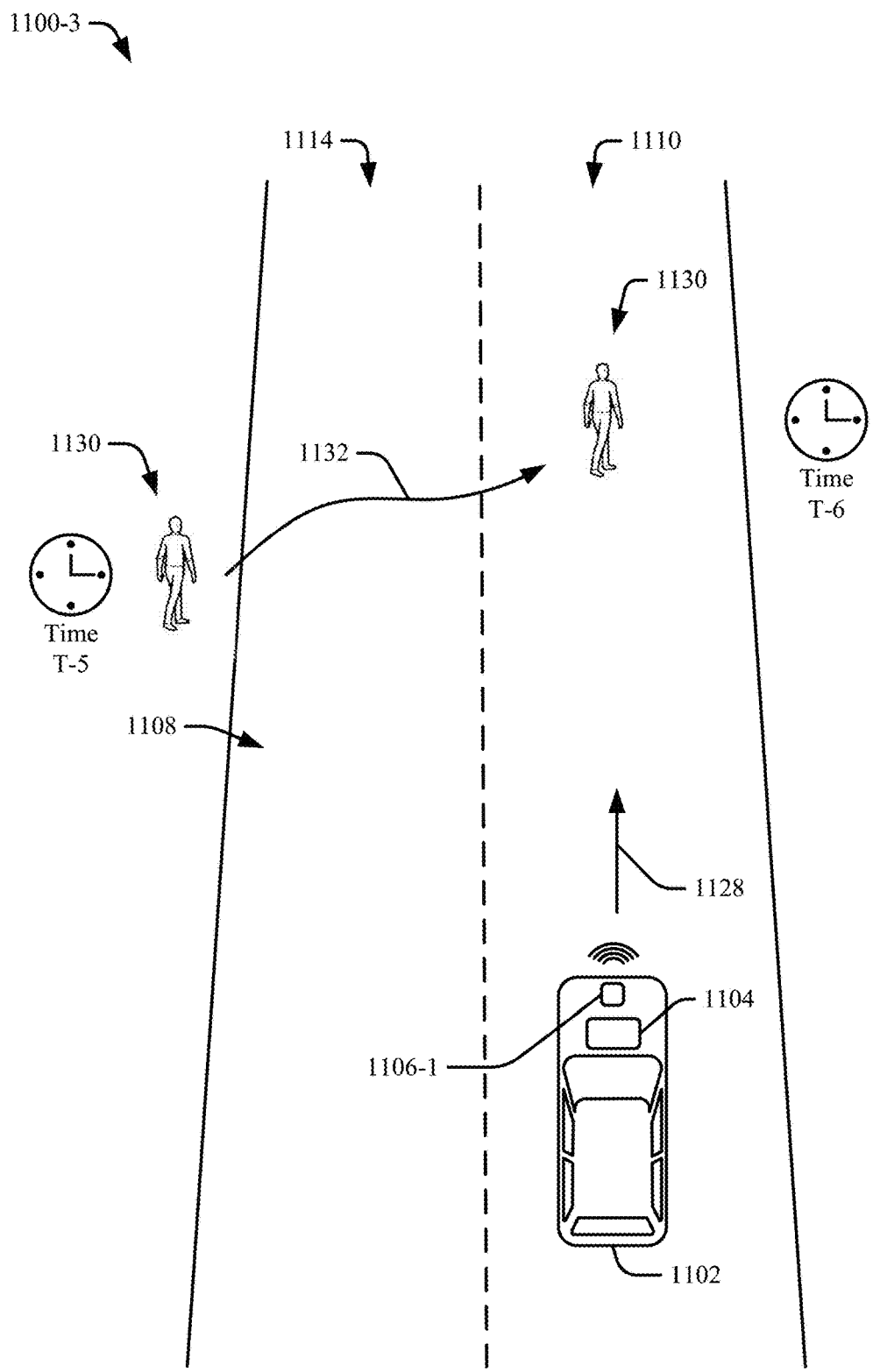

Large errors in estimated kinematic states may be reduced, in accordance with techniques of this disclosure. In response to reducing the large errors in estimated kinematic states, the object tracking system may be able to predict a target path with accuracy, which may result in less collisions and more safety Example Scenarios FIGS. 11-1 to 11-3 illustrate example scenarios of target curvature estimation considering vehicle dynamics, in accordance with techniques of this disclosure. The example scenarios may be based on aspects of the example environment illustrated in FIG. 1 and the example automotive system illustrated in FIG. 2.

In FIG. 11-1, a host vehicle 1102 is equipped with an ADAS 1104, which is an example of the ADAS 104, and a radar sensor 1106-1, which is an example of the radar sensor 106. The host vehicle 1102 is navigating a road 1108 in a lane 1110 on a path 1112. In an adjacent lane 1114 of the road 1110, a target vehicle 1116 is navigating in the same direction as the host vehicle 1102 at a time T-1. Radar detections received by the radar sensor 1106 are used by a radar tracking module (i.e., radar tracking module 108-1) in the ADAS 1104 to predict a path 1118 of the target vehicle 1116.

As time transitions from time T-1 to time T-2, the radar tracking module of the ADAS 1104 may use various measurement states derived from the radar detections received by the radar sensor 1106 to estimate a curvature state of the target vehicle 1116. The curvature state may be used to determine an estimated centripetal acceleration. If the estimated centripetal acceleration state exceeds an upper bound as determined based on the techniques described herein, the upper bound value is used as the centripetal acceleration state value. Based on the predicted path 1118, the host vehicle 1102 may take evasive action and avoid a collision as the target vehicle moves into the lane 1110 at time T-2.

In FIG. 11-2, the host vehicle 1102 is backing into a parking space 1120. At time T-1, the ADAS 1104 may be tracking a pedestrian 1122-1 based on radar detections received by a radar sensor 1106-2, which is an example of the radar sensor 106 and is located in a rear area of the host vehicle 1102. As the host vehicle 1102 follows a path 1124, the ADAS 1104 may predict a path 1126 of the pedestrian 1122-1. By time T-2, the pedestrian 1122 may have walked into the parking space 1120. The host vehicle 1102 may avoid hitting the pedestrian by using the techniques previously described, estimating the centripetal acceleration of the pedestrian 1122, for example, to set the upper bound.

In FIG. 11-3, the host vehicle 1102 is navigating the road 1108 in the lane 1110 on the path 1128. At time T-5, the ADAS 1104 begins tracking a pedestrian 1130 and predicting a path 1132 for the pedestrian 1130. In the same manner as the previous scenarios, the host vehicle 1102 may be able to take evasive action and avoid a collision with the pedestrian 1130 as the pedestrian 1130 walks into the lane 1110 at time T-6

ADDITIONAL EXAMPLES

In the following section, additional examples of target curvature estimation considering vehicle dynamics constraints are provided.

Example 1

A method comprising: determining, by a processor of a host vehicle, measurement states of a target, the measurement states being derived from radar detections received by an object tracking system of the host vehicle; determining, based at least in part on the measurement states, one or more kinematic states of a motion model defined for a tracking filter employed by the object tracking system to track the target; predicting, using the one or more kinematic states as inputs to the motion model of the tracking filter, a path of the target; and controlling, based on the predicted path of the target, the host vehicle to take evasive action and avoid a collision with the target.

Example 2

The method of example 1, further comprising: determining a first upper bound for the estimates of the at least one or more kinematic states of the motion model; determining a second upper bound for the estimates of the at least one or more kinematic states of the motion model; determining a third upper bound for the estimates of the at least one or more kinematic states of the motion model, the third upper bound being equivalent to a lesser of the first upper bound and the second upper bound; and determining a constraint for the at least one or more kinematic states of the motion model, the constraint being equivalent to the third upper bound, wherein determining the one or more kinematic states is further based on the constraint.

Example 3

The method of example 2, wherein: determining the first upper bound comprises determining the first upper bound using the Pacejka Magic Formula.

Example 4

The method of example 2, wherein: determining the second upper bound comprises determining the second upper bound from a friction force ellipse model.

Example 5

The method of example 1, wherein: determining, based on the measurement states, estimates of the at least one or more kinematic states of a motion model, the motion model being a Constant Turn Constant Tangential Acceleration model.

Example 6

The method of example 1, wherein: predicting the path of the target by the tracking filter, based on the motion model, the tracking filter being an extended Kalman Filter.

Example 7

The method of example 2, wherein: determining the first upper bound, the second upper bound, and the third upper bound for the estimates of the at least one or more kinematic states of the motion model, the kinematic state being curvature state.

Example 8

A system comprising: a host vehicle; an object tracking system configured to receive radar detections; and one or more processors configured to: determine measurement states of a target, the measurement states being derived from the radar detections received by the object tracking system; determine one or more kinematic states of a motion model defined for a tracking filter employed by the object tracking system to track the target; predict, using the one or more kinematic states as inputs to the motion model of the tracking filter, a path of the target; and control, based on the predicted path of the target, the host vehicle to take evasive action and avoid a collision with the target.

Example 9

The system of example 8, wherein the one or more processors are further configured to determine a first upper bound for the estimates of the at least one or more kinematic states of the motion model; determine a second upper bound for the estimates of the at least one or more kinematic states of the motion model; determine a third upper bound for the estimates of the at least one or more kinematic states of the motion model, the third upper bound being equivalent to a lesser of the first upper bound and the second upper bound; and determine a constraint for the at least one or more kinematic states of the motion model, the constraint being equivalent to the third upper bound, wherein determining the one or more kinematic states is further based on the constraint.

Example 10

The system of example 9, wherein the one or more processors are further configured to determine the first upper bound using the Pacejka Magic Formula.

Example 11

The system of example 9, wherein the one or more processors are further configured to determine the second upper bound from a friction force ellipse model.

Example 12

The system of example 8, wherein the one or more processors are further configured to determine, based on the measurement states, estimates of the at least one or more kinematic states of a motion model, the motion model being a Constant Turn Constant Tangential Acceleration model.

Example 13

The system of example 8, wherein the one or more processors are further configured to predict the path of the target by the tracking filter, based on the motion model, the tracking filter being an extended Kalman Filter.

Example 14

The system of example 9, wherein the one or more processors are further configured to determine the first upper bound, the second upper bound, and the third upper bound for the estimates of the at least one or more kinematic states of the motion model, the kinematic state being curvature state.

Example 15

The system of example 8, wherein the object tracking system comprises a radar system configured to receive the radar detections.

Example 16

The system of example 8, wherein the target comprises another vehicle in a travel path of the host vehicle.

Example 17

The system of example 16, wherein the travel path comprises a forward trajectory of the host vehicle or a reverse trajectory of the host vehicle.

Example 18

The system of example 8, wherein the target comprises a pedestrian or animal in a travel path of the host vehicle.

Example 19

The system of example 8, wherein the at least one processor is further configured to, after initiating control of the vehicle to take the evasive action and avoid the collision with the target: update the kinematic states of the motion model based on updated measurement states of the target; predict, using the updated kinematic states as the inputs to the motion model, an updated path of the target; and control the host vehicle to take further evasive action and avoid the collision with the target based on the updated path of the target.

Example 20

A system comprising: means for determining, by a processor of a host vehicle, measurement states of a target, the measurement states being derived from radar detections received by an object tracking system of the host vehicle; means for determining, based on the measurement states, one or more kinematic states of a motion model defined for a tracking filter employed by the object tracking system to track the target; means for predicting, using the one or more kinematic states as inputs to the motion model of the tracking filter, a path of the target; and means for controlling, based on the predicted path of the target, the host vehicle to take evasive action and avoid a collision with the target.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. Problems associated with large errors in target curvature estimation can occur in other systems. Therefore, although described as a way to improve target curvature estimation considering vehicle dynamics techniques, the techniques of the foregoing description can be applied to other assignment problems to reduce a total number of assignments between tasks and agents.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   determining, by a processor of a host vehicle, measurement states of a target, the measurement states being derived from radar detections received by an object tracking system of the host vehicle;
   determining, based at least in part on the measurement states, estimates of one or more kinematic states of a motion model defined for a tracking filter employed by the object tracking system to track the target, at least one of the kinematic states being curvature;
   determining, for a constrained motion model, a respective constrained kinematic state for each respective kinematic state of the one or more kinematic states by:
     determining a first upper bound for each respective kinematic state using a first dynamics model;
     determining a second upper bound for each respective kinematic state using a second dynamics model;
     determining a third upper bound for each respective kinematic state by comparing the first upper bound and the second upper bound and selecting the respective upper bound that has a lesser value to be the third upper bound; and
     using the third upper bound for each respective kinematic state as the constrained kinematic state for that respective kinematic state;
   comparing, using the estimates of the one or more kinematic states as inputs to the motion model and using the respective constrained kinematic states as inputs to the constrained motion model, the motion model to the constrained motion model;
   predicting, using the one or more kinematic states as inputs to the motion model of the tracking filter based on the comparison of the motion model to the constrained motion model, a path of the target; and
   controlling, based on the predicted path of the target, the host vehicle to take evasive action and avoid a collision with the target.

2. The method of claim 1, wherein predicting, using the one or more kinematic states as inputs to the motion model of the tracking filter based on the comparison of the motion model to the constrained motion model, a path of the target comprises:
   responsive to the one or more kinematic states exceeding the respective constrained kinematic state, projecting an unconstrained estimation to a constrained surface.

3. The method of claim 1, wherein:
   determining the first upper bound comprises determining the first upper bound using the Pacejka Magic Formula.

4. The method of claim 1, wherein:
   determining the second upper bound comprises determining the second upper bound from a friction force ellipse model.

5. The method of claim 1, wherein:
determining, based on the measurement states, estimates of the one or more kinematic states of a motion model, the motion model being a Constant Turn Constant Tangential Acceleration model.

6. The method of claim 1, wherein:
predicting the path of the target by the tracking filter, based on the motion model, the tracking filter being an extended Kalman Filter.

7. The method of claim 1, wherein:
determining the first upper bound, the second upper bound, and the third upper bound for the estimates of the one or more kinematic states of the motion model, the kinematic state being a centripetal acceleration state.

8. A system comprising:
a host vehicle;
an object tracking system configured to receive radar detections; and
one or more processors configured to:
    determine measurement states of a target, the measurement states being derived from the radar detections received by the object tracking system;
    determine estimates of one or more kinematic states of a motion model defined for a tracking filter employed by the object tracking system to track the target;
    determine, for a constrained motion model, a respective constrained kinematic state for each respective kinematic state of the one or more kinematic states by:
        determining a first upper bound for each respective kinematic state using a first dynamics model;
        determining a second upper bound for each respective kinematic state using a second dynamics model;
        determining a third upper bound for each respective kinematic state by comparing the first upper bound and the second upper bound and selecting the respective upper bound that has a lesser value to be the third upper bound; and
        using the third upper bound for each respective kinematic state as the constrained kinematic state for that respective kinematic state;
    compare, using the estimates of the one or more kinematic states as inputs to the motion model and using the respective constrained kinematic states as inputs to the constrained motion model, the motion model to the constrained motion model;
    predict, using the one or more kinematic states as inputs to the motion model of the tracking filter based on the comparison of the motion model to the constrained motion model, a path of the target; and
    control, based on the predicted path of the target, the host vehicle to take evasive action and avoid a collision with the target.

9. The system of claim 8, wherein the one or more processors are configured to predict, using the one or more kinematic states as inputs to the motion model of the tracking filter based on the comparison of the motion model to the constrained motion model, a path of the target by at least:
    responsive to the one or more kinematic states exceeding the respective constrained kinematic state, projecting an unconstrained estimation to a constrained surface.

10. The system of claim 8, wherein the one or more processors are further configured to:
    determine the first upper bound using the Pacejka Magic Formula.

11. The system of claim 8, wherein the one or more processors are further configured to:
    determine the second upper bound from a friction force ellipse model.

12. The system of claim 8, wherein the one or more processors are further configured to:
    determine, based on the measurement states, estimates of the one or more kinematic states of a motion model, the motion model being a Constant Turn Constant Tangential Acceleration model.

13. The system of claim 8, wherein the one or more processors are further configured to:
    predict the path of the target by the tracking filter, based on the motion model, the tracking filter being an extended Kalman Filter.

14. The system of claim 8, wherein the one or more processors are further configured to:
    determine the first upper bound, the second upper bound, and the third upper bound for the estimates of the one or more kinematic states of the motion model, the kinematic state being a centripetal acceleration state.

15. The system of claim 8, wherein the object tracking system comprises a radar system configured to receive the radar detections.

16. The system of claim 8, wherein the target comprises another vehicle in a travel path of the host vehicle.

17. The system of claim 16, wherein the travel path comprises a forward trajectory of the host vehicle or a reverse trajectory of the host vehicle.

18. The system of claim 8, wherein the target comprises a pedestrian or animal in a travel path of the host vehicle.

19. The system of claim 8, wherein the one or more processors are further configured to, after initiating control of the vehicle to take the evasive action and avoid the collision with the target:
    update the kinematic states of the motion model based on updated measurement states of the target;
    predict, using the updated kinematic states as the inputs to the motion model, an updated path of the target; and
    control the host vehicle to take further evasive action and avoid the collision with the target based on the updated path of the target.

20. A non-transitory computer-readable storage media comprising instructions that, when executed, cause a processor to:
    determine measurement states of a target, the measurement states being derived from radar detections received by an object tracking system;
    determine estimates of one or more kinematic states of a motion model defined for a tracking filter employed by the object tracking system to track the target;
    determine, for a constrained motion model, a respective constrained kinematic state for each respective kinematic state of the one or more kinematic states by:
        determining a first upper bound for each respective kinematic state using a first dynamics model;
        determining a second upper bound for each respective kinematic state using a second dynamics model;
        determining a third upper bound for each respective kinematic state by comparing the first upper bound and the second upper bound and selecting the respective upper bound that has a lesser value to be the third upper bound; and using the third upper bound for each respective kinematic state as the constrained kinematic state for that respective kinematic state;

compare, using the estimates of the one or more kinematic states as inputs to the motion model and using the respective constrained kinematic states as inputs to the constrained motion model, the motion model to the constrained motion model;

predict, using the one or more kinematic states as inputs to the motion model of the tracking filter based on the comparison of the motion model to the constrained motion model, a path of the target; and control, based on the predicted path of the target, the host vehicle to take evasive action and avoid a collision with the target.

* * * * *

UNITED STATES PATENT AND TRADEMARK OFFICE
CERTIFICATE OF CORRECTION

PATENT NO. : 11,780,429 B2  
APPLICATION NO. : 17/170819  
DATED : October 10, 2023  
INVENTOR(S) : Wang et al.

Page 1 of 1

It is certified that error appears in the above-identified patent and that said Letters Patent is hereby corrected as shown below:

On the Title Page

At Column 2, item (56) Other Publications, Line 1, delete "Kalam" and insert --Kalman--.

Signed and Sealed this  
Fifteenth Day of April, 2025

Coke Morgan Stewart  
*Acting Director of the United States Patent and Trademark Office*